United States Patent Office 3,261,380
Patented July 19, 1966

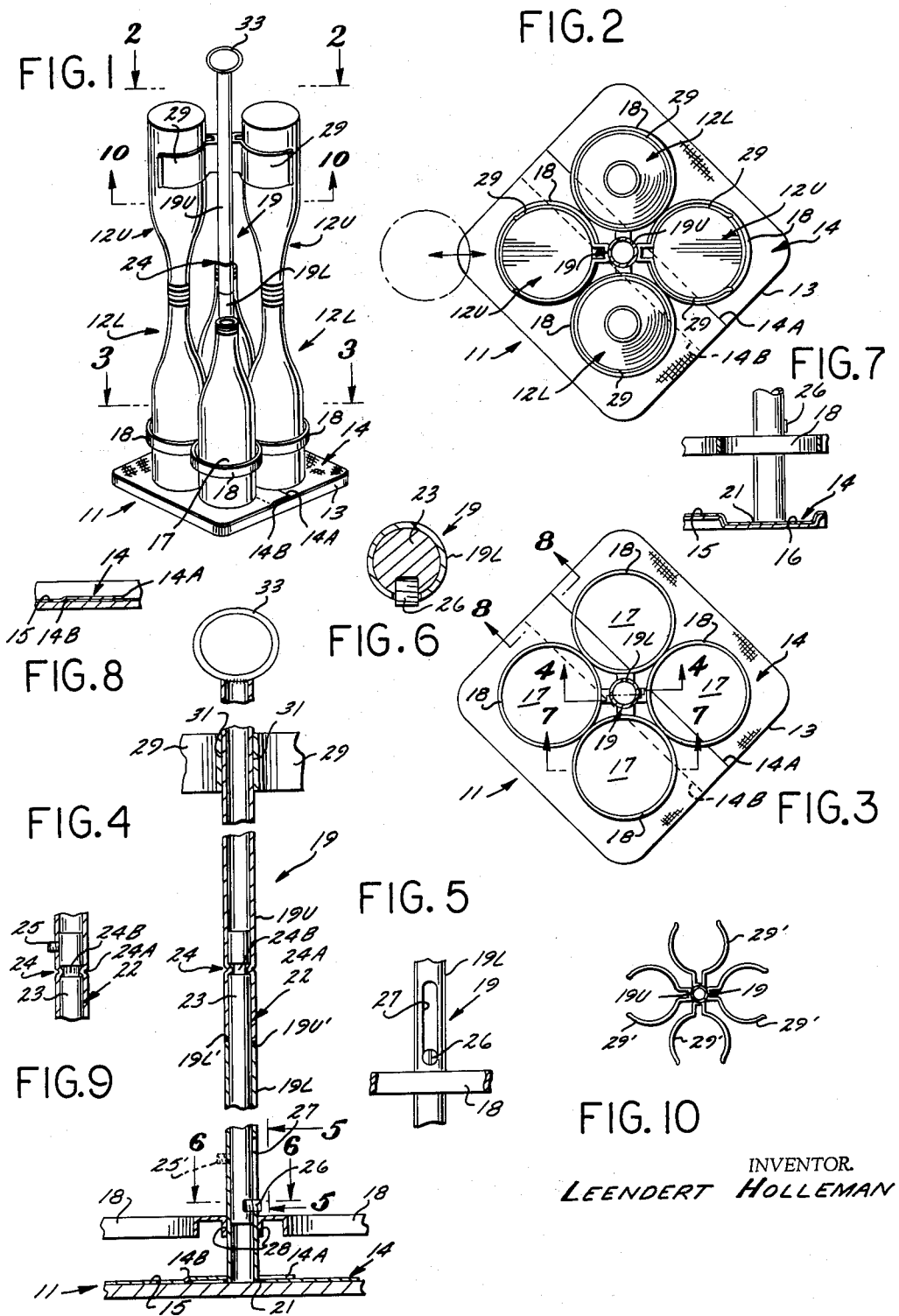

3,261,380
BOTTLE DRAINING APPARATUS
Leendert Holleman, 5276 Linden Ave.,
Long Beach 5, Calif.
Filed Apr. 20, 1964, Ser. No. 360,929
14 Claims. (Cl. 141—106)

Generally speaking, the present invention relates to bottle cleaning apparatus and, more particularly, in one exemplary form thereof pertains to bottle draining apparatus which is particularly well adapted for use in facilitating the draining of nearly empty ketchup bottles, although the invention is not specifically so limited and is also advantageous for facilitating the draining of any relatively thick, viscous, pasty, and/or semiliquid material which may be said to be of a generally slurry-like or thickened form which is difficult to drain out of the neck of a bottle and, in particular, out of a narrow-necked bottle generally similar to a conventional ketchup bottle.

The description which follows will be primarily directed to the particular application of the present invention to the draining of narrow-necked ketchup bottles, since this is an especially advantageous use of the invention. However, it should be clearly understood that this is done for exemplary purposes only and that the invention is not to be construed as being specifically limited thereto, and, in this connection, it should be noted that the description which follows hereinafter shall be broadly construed and interpreted in the light of the statement as to the intended scope of the present invention as just set forth above.

It should be noted that restaurant owners, and the like, find that it is difficult to achieve full utilization of all of the ketchup in a conventional narrow-necked ketchup bottle because of the fact that when the bottle is nearly empty the ratio of the surface of the ketchup exposed to air with respect to the total volume thereof becomes greatly increased, and there is a tendency for the remaining small quantity of ketchup within a ketchup bottle to partially dry out and thicken and to adhere to the inside bottom and side wall portions of the ketchup bottle and to generally become quite difficult to dispense. This occurs because the partial drying out and thickening of the small remaining quantity of ketchup reduces its tendency to flow readily under the action of gravity, and the tendency for it to adhere to the inside surfaces of the ketchup bottle additionally decreases the tendency of the ketchup to flow under the action of gravity so that when the ketchup bottle is inverted and is in a nearly empty condition, it will be found that an excessively long period of time must elapse before the very slowly flowing ketchup will finally reach the conventional small open end of the inverted ketchup bottle and will flow therefrom onto a desired food object.

The above-mentioned period of excessive delay is such that most restaurant patrons are either too impatient to wait for the slowly flowing ketchup to reach the open end of the inverted ketchup bottle or the restaurant patron may become convinced that this will not occur at all and that it is impossible to get any ketchup out of the bottle. In either case it is quite customary for the patron to decide that, if a ketchup bottle appears to him to be in this condition after having made a minor attempt to get some ketchup out of the bottle without much success, he should stop trying and should ask the restaurant owner for a fresh new bottle of ketchup. This occurs only partly because of the small degree of difficulty encountered in pouring out the last small quantity of ketchup from a nearly empty ketchup bottle. Another reason for the restaurant patron's requesting a fresh bottle of ketchup stems from the fact that he probably decides that the ketchup is somewhat old and not fresh, and this seems undesirable to him, quite apart from any difficulty encountered in dispensing the small quantity of ketchup from a nearly empty ketchup bottle.

The above-mentioned second reason is primarily a psychological factor, and it is actually quite invalid since ketchup does not deteriorate readily under normal conditions of use and usually the small amount of ketchup remaining in a nearly empty ketchup bottle is just as good as that from a newly opened bottle.

However, since the above-mentioned problem does exist for restaurant owners, it often leads to considerable waste of ketchup unless the restaurant owner is prepared to drain such nearly empty ketchup bottles into other ketchup bottles so as to accumulate a larger quantity of ketchup in the receiving bottle or bottles which can then be used by restaurant patrons. However, this type of procedure, involving the draining of nearly empty ketchup bottles into other bottles having larger amounts of ketchup therein is a time-consuming operation and also a relatively difficult operation since it requires inverting a relatively narrow-necked ketchup bottle and placing same directly over and in exact vertical alignment with the narrow neck of an underlying receiving ketchup bottle and maintaining this relationship for the necessary period of time required to complete the draining operation.

It is precisely for the purpose of solving the above-mentioned problem that the present invention was invented by me since it provides a means for holding one or more such inverted nearly empty ketchup bottles in such vertically aligned relationship with respect to a corresponding number of underlying erect ketchup bottles for whatever period of time is required to complete the draining operation—and it does this with no attention being required after the initial mounting of the bottles in the apparatus.

With the above points in mind, it is an object of the present invention to provide a novel bottle draining apparatus of the character referred to hereinbefore and hereinafter and having any or all of the features referred to hereinbefore or hereinafter, generically and/or specifically, and either individually or in combination, and being of relatively simple, inexpensive, easy-to-use construction adapted for mass manufacture at relatively low cost, whereby to be conducive to widespread use thereof.

Further objects are implicit in the detailed description which follows hereinafter (which is to be considered as exemplary of, but not specifically limiting, the present invention), and said objects will be apparent to persons skilled in the art after a careful study of the detailed description which follows hereinafter.

For the purpose of clarifying the nature of the present invention two exemplary embodiments of the invention are illustrated in the hereinbelow-described figures of the accompanying single drawing sheet and are described in detail hereinafter.

FIG. 1 is a reduced-size three-dimensional view of one exemplary embodiment of the present invention showing it in one exemplary type of operative relationship with respect to a plurality of ketchup bottles—said ketchup bottles including two inverted ketchup bottles in aligned relationship with, and being drained into, two underlying erect receiving ketchup bottles and with two other erect ketchup bottles positioned on the underlying tray for subsequent filling operations thereinto.

FIG. 2 is a top view taken in the direction of the arrows 2—2 of FIG. 1 and shows the upper portion of the central post member in cross section and shows all of the remaining elements of the apparatus below the plane of the arrows 2—2 in full top plan view.

FIG. 3 is a view taken in the direction of the arrows 3—3 of FIG. 1 but with all of the lower ketchup bottles removed.

FIG. 4 is a fragmentary vertical central plane sectional view, taken substantially on a plane such as that indicated by the arrows 4—4 of FIG. 3. Portions of the underlying tray member and the plurality of bottle receiving and positioning constraint ring means carried by the lower portion of the central post member and portions of the plurality of upper bottle receiving and holding clamp means carried by the upper portion of the post member are broken away, as are parts of the central post member itself in both the upper and lower portions thereof. This is done for drawing space conservation reasons.

FIG. 5 is an enlarged fragmentary view taken in the direction of the arrows 5—5 of FIG. 4.

FIG. 6 is an enlarged cross-sectional view, taken in the direction of the arrows 6—6 of FIG. 4 with all portions of the apparatus below the plane of said sectional view being removed for reasons of drawing simplification.

FIG. 7 is a fragmentary view taken in the direction of the arrows 7—7 of FIG. 3 and illustrates a typical exemplary one of the recess means formed in the underlying tray member and adapted to receive and fix the position of the bottom of a corresponding one of the plurality of erect ketchup bottles such as shown in FIGS. 1 and 2.

FIG. 8 is an enlarged fragmentary sectional view taken in the direction of the arrows 8—8 of FIG. 3.

FIG. 9 is a fragmentary view of a slightly modified form of the invention and shows a part of the upper tubular portion of the central post member and a part of the rod member therein similar to the showing of FIG. 4 but additionally provided with rotative-movement-preventing means which can be engaged when desired so as to prevent relative rotation of the upper tubular portion of the post member with respect to the lower tubular portion thereof.

FIG. 10 is a view of a modified form of the invention as it would appear when taken in the direction of the arrows 10—10 of FIG. 1. In this connection, it should be clearly understand that FIG. 10 is not actually a view taken in the direction of the arrows 10—10 of FIG. 1, but is such a view taken of a modified version of FIG. 1, having a different type of upper bottle receiving and holding spring clamp means adapted to clamp and hold in inverted relationship up to four ketchup bottles rather than up to two ketchup bottles as shown in FIGS. 1 and 2.

Generally speaking, the exemplary first form of the invention illustrated in FIGS. 1–8 comprises an underlying tray or platform member, one exemplary form of which is generally indicated at 11 and which is shown as being of substantially rectangular or square configuration as seen in plan view and which is adapted to support a plurality of open-topped narrow-necked bottles in upstanding erect relationship thereon in a general manner such as is best shown in FIG. 1. It should be noted that, in the exemplary form of the invention illustrated, each of said erect upstanding narrow-necked bottles may be said to comprise a lower or lower-positioned erect bottle and is illustrated in the drawing as comprising an upwardly open erect lower ketchup bottle generally designated by the reference numeral 12L.

It should also be noted that, in the exemplary first form of the invention illustrated, the tray or platform member 11 is provided with an upwardly directed liquid-retaining edge or guard means 13 completely around the periphery thereof, and is also provided with a controllably removable and disposable protective tray-covering shield means, indicated generally at 14, adapted to be engaged and received by the upper surface 15 of the tray 11 and by the upstanding edge or guard means 13, which may be said to effectively comprise engaging and receiving means for engaging and receiving the controllably removable and disposable protective tray-covering shield means 14.

Incidentally, it should also be noted that, in the exemplary first form of the invention illustrated, the tray or platform member 11 is provided with four bottle-bottom-receiving recess means or portions, such as the exemplary one clearly shown at 16 in FIG. 7—it being understood that the other three are of similar construction. This provides an arrangement such that the bottom of each of the enlarged lower portions of the lower ketchup bottles 12L may be received within the corresponding one of the four receiving recesses, such as the exemplary one shown at 16 in FIG. 7, in a manner such as to rest upon the corresponding portion of the controllably removable and disposable protective tray-covering shield means 14 with cylindrical side wall parts of said enlarged lower portions 17 of said ketchup bottles 12L being received, positioned, and held within the corresponding ones of a plurality of (four in the example illustrated) bottle receiving and positioning constraint ring means 18 whereby to cause each of the four lower erect upstanding ketchup bottles 12L to be positively positioned in four predetermined symmetrically located positions around a central upstanding post or standard member such as is indicated generally at 19.

It should be noted that said upstanding post or standard member 19 has a lower portion 19L fixedly fastened as indicated at 21 to the center of said underlying tray or platform member 11 and has an upper portion 19U which is effectively vertically slidably telescopically mounted and/or coupled with respect to the lower portion 19L whereby to be controllably telescopically upwardly extendable with respect to said lower portion 19L by a predetermined distance.

In the exemplary first form of the invention illustrated, said slidable mounting of said upper post member portion 19U with respect to said lower post member protion 19L is effectively accomplished by the provision of longitudinally slidable coupling means indicated generally at 22 which is shown in one exemplary form as comprising a rod member 23 which is longitudinally firmly fastened with respect to the tubular upper portion 19U of the post member 19 but which is freely relatively rotatable with respect thereto—this being accomplished by a longitudinally non-extendable but freely rotatable fastening means, one exemplary type of which is indicated generally at 24 and which may be said to comprise inwardly projecting dimple or detent means 24A formed inwardly in the side wall of the tubular upper post member portion 19U into the other portion of said fastening means which comprises an annular groove 24B carried adjacent to the upper end of the rod member 23. It will be understood that the inwardly projecting dimple or detent means 24A will be freely rotatable in the annular groove 24B carried by the upper end of the rod 23 but will be longitudially non-movable with respect thereto. The rod member 23 extends downwardly past the open lower end 19U' of the upper post member portion 19U and extends downwardly into and past the open upper end 19L' of the lower post member portion 19L so that the lower portion of said rod 23 may slide in the tubular lower post member portion 19L at any point below the open upper end 19L' thereof. This will allow the upper post member portion 19U to vertically slide upwardly from the position shown in FIG. 4 with respect to the lower post member portion 19L a predetermined distance as determined by the stop screw 26 threaded radially into the lower end of the rod 23 and extending outwardly for limited vertical sliding movement in the vertical slot 27 carried in the tubular lower post member portion 19L.

It should be noted that, in the exemplary first form of the invention illustrated, the hereinbefore-mentioned plurality of bottle receiving and positioning constraint ring means 18 are rigidly fastened to the lower tubular post member portion 19L as is most clearly indicated at 28 in FIG. 4, while a plurality of upper bottle receiving and holding spring clamp means 29 are similarly rigidly fastened to the upper post member portion 19U as is most clearly shown at 31 in FIG. 4.

The arrangement is such that the lower erect bottles 12L can be positively positioned in predetermined locations by mounting them in the lower constraint ring means 18 in the manner described hereinbefore and clearly shown in FIG. 1, and then nearly empty ketchup bottles may be engaged in inverted relationship in the upper bottle receiving and holding spring clamp means 29 in vertically aligned relationship with respect to the corresponding lower erect ketchup bottles 12L as is most clearly shown in FIG. 1.

The above-mentioned upper inverted ketchup bottles are designated by the reference numeral 12U in FIGS. 1 and 2 and have their open ends 32U downwardly directed and in abutment with the corresponding upwardly directed open ends 32L of the corresponding lower ketchup bottles 12L. In the example illustrated in FIGS. 1 and 2, this is only true with respect to two of the four lower ketchup bottles 12L and the corresponding two upper ketchup bottles 12U—the other two lower ketchup bottles 12L not having any upper ketchup bottles 12U positioned in vertically superimposed inverted relationship thereover in this form of the invention.

It will be noted that the two inverted upper ketchup bottles 12U, when in the operative draining relationship clearly shown in FIGS. 1 and 2, will slowly drain out substantially all of the small amount of ketchup initially therein, which will be received in the corresponding two upstanding erect lower and substantially fuller ketchup bottles 12L.

Repositioning of any of the upper ketchup bottles 12U with respect to any of the lower ketchup bottles 12L can be conveniently effected by merely grasping the handle means 33 carried at the top of the upper post member portion 19U and lifting same so as to slide the upper post member 19U upwardly to any desired degree within the limits determined by the stop screw 26 and the upper end of the slot 27 (best shown in FIGS. 4 and 5). Then the upper post member portion 19U can be rotated to a new bottle alignment position if desired, or either one or both of the upper inverted ketchup bottles 12U can be removed from the spring clamp means 29 and additional nearly empty ketchup bottles can be mounted therein in inverted relationship and positioned over the same lower ketchup bottles 12L, or over the other pair thereof, if desired, and another draining operation can be allowed to proceed under the action of gravity.

When all of the desired draining operations have been completed, the emptied or drained inverted ketchup bottles 12U can be removed and the lower portion of the device can be used for storage of either the filled or partially filled lower ketchup bottles 12L (which will normally have their caps replaced thereon) or can be used for storage of completely full ketchup bottles, if desired, until they are subsequently used or until the next draining and ketchup bottle refilling operations are to be performed.

Incidentally, it should be noted that the upper handle means 33 can be very conveniently used for carrying the entire device from one location to another.

It should be noted that the edge or guard means 13 acts to prevent any inadvertently spilled ketchup from running off the edge of the underlying tray member 11 onto adjacent surfaces which would be undesirable.

Also, in the first exemplary form of the invention illustrated, an additional cleanliness and sanitation feature is provided by the hereinbefore-mentioned controllably removable and disposable protective tray-covering shield means 14 which may be made of foil, laminated plastic material, paper material, or any other material, either intrinsically of a nature such, or treated so as to have a nature such, as to be substantially impervious to any accidentally spilled ketchup. Thus, if any ketchup is accidentally spilled, said shield 14 can be removed, thrown away, and replaced with a fresh clean protective shield 14. In order to facilitate the mounting and removal of the shield 14, it is shown as comprising two partially overlapping shield portions 14A and 14B which make it possible to conveniently mount same so as to completely surround the bottom portion of the upstanding post member 19 while completely covering the upper surface 15 of the underlying tray or platform member 11. However, various other constructions and mounting arrangements may be employed. In a preferred arrangement, the edge of the protective shield 14 may extend upwardly to the top of the edge 13 of the tray 11 or may extend slightly over the top of said edge 13 and, in certain forms of the invention, may extend down the outside surface thereof to any desired extent. This will not only completely protect the device from any inadvertently spilled ketchup, but will also provide a convenient outer peripheral edge of the shield 14 to be digitally grasped when the shield 14 is to be removed and replaced.

Under certain conditions of use it may be desirable to rotatively immobilize the upper tubular center post member portion 19U with respect to the lower tubular center post member portion 19L. For example, if erect and inverted bottles have been lined up in draining relationship and it is desired to prevent any possible misalignment thereof, such rotative immobilization may be desired. This may be accomplished by providing the tubular upper center post member portion 19U with a locking set screw, such as is clearly shown at 25 in FIG. 9, which is threaded in the tubular upper center post member portion 19U for locking abutment with respect to the rod member 23 when desired.

A similar locking set screw, such as shown in phantom at 25' in FIG. 4, may be carried by the lower tubular center post member portion 19L if desired for controllably engageable locking cooperation with respect to the rod member 23 which will prevent slidable upward movement of the upper center post member portion 19U with respect to the lower center post member portion 19L if desired. This may be locked when the complete device is to be lifted by the handle means 33 while erect and inverted bottles are in draining relationship such as is shown in FIG. 1 and when it is desired to maintain the bottles in the fully engaged draining relationship shown in FIG. 1 without either separating or misaligning the open bottle ends 32U and 32L.

FIG. 10 is a view of a modified form of the device as it would appear when viewed in the direction of the arrows 10—10 of FIG. 1 and with no inverted bottles engaged by the upper spring clamp means. In this modification it will be noted that the upper spring clamp means are four in number rather than two in number as in the first form of the invention, and they are designated by the reference numeral 29' since they comprise a modification of the form illustrated in FIG. 1. Otherwise, this modification of the invention is similar to the first form illustrated in FIGS. 1–8, and where applicable in FIG. 10 similar reference numerals, primed, however, are employed to designate corresponding parts. It will be noted that the modified upper spring clamp means 29' of FIG. 10 makes it possible to mount four inverted upper ketchup bottles similar to the two shown at 12U in FIGS. 1 and 2 so as to be in vertically aligned and ketchup-draining relationship with respect to four underlying erect lower ketchup bottles similar to those shown at 12L in FIG. 1 so that four ketchup bottle draining operations can be performed at the same time, if desired.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:
1. Bottle draining apparatus comprising: an underlying tray member adapted to support at least one open-topped narrow-necked bottle in upstanding relationship thereon; and an upstanding post member carried by said tray member and extending to a substantial height thereabove, said upstanding post member having a lower portion closely adjacent to said underlying tray member and provided with at least one bottle receiving and positioning constraint means cooperable to receive a corresponding enlarged bottom portion of a corresponding lower upwardly open narrow-necked bottle in erect relationship with the bottom thereof resting on said tray member and with the open top thereof being upwardly directed, said upstanding post member having an upper portion provided with at least one bottle receiving and holding clamp means adapted to receive, engage, and hold the corresponding enlarged bottom portion of a corresponding upper narrow-necked open-topped bottle in inverted relationship positioned directly over and in vertical alignment with said lower upwardly open narrow-necked bottle received and held by said lower bottle receiving and holding constraint means in erect relationship whereby to provide for the emptying of the contents of the upper inverted bottle into the corresponding erect lower bottle under the action of gravity.

2. Apparatus as defined in claim 1, wherein said upper portion of said upstanding post member is controllably upwardly extendable with respect to the lower portion thereof to facilitate separation of the open ends of the inverted upper bottle carried by said upper bottle holding clamp means and the corresponding lower erect bottle carried by said lower bottle holding and receiving constraint means.

3. Apparatus as defined in claim 1, wherein said upper and lower portions of said upstanding post member are provided with longitudinally slidable and rotary coupling means for relatively vertically upwardly telescopically slidably and relatively rotatably mounting said upper portion thereof with respect to said lower portion thereof to facilitate separation and repositioning of the open ends of the inverted upper bottle carried by said upper bottle holding clamp means and the corresponding vertically aligned lower bottle carried by said lower bottle holding and receiving constraint means.

4. Apparatus as defined in claim 1, wherein said upper and lower portions of said upstanding post member are provided with longitudinally slidable and rotary coupling means for relatively vertically upwardly telescopically slidably and relatively rotatably mounting said upper portion thereof with respect to said lower portion thereof to facilitate separation and repositioning of the open ends of the inverted upper bottle carried by said upper bottle holding clamp means and the corresponding vertically aligned lower bottle carried by said lower bottle holding and receiving constraint means, said longitudinally slidable and rotary coupling means being provided with travel-limiting stop means for limiting the relative upward movement of said upper portion of said upstanding post member to a predetermined maximum value, after which said upper and lower portions thereof effectively comprise a tensile carrying means for carrying the entire device.

5. Apparatus as defined in claim 1, wherein said upper and lower portions of said upstanding post member are provided with longitudinally slidable and rotary coupling means for relatively vertically upwardly telescopically slidably and relatively rotatably mounting said upper portion thereof with respect to said lower portion thereof to facilitate separation and repositioning of the open ends of the inverted upper bottle carried by said upper bottle holding clamp means and the corresponding vertically aligned lower bottle carried by said lower bottle holding and receiving constraint means, said longitudinally slidable and rotary coupling means being provided with travel-limiting stop means for limiting the relative upward movement of said upper portion of said upstanding post member to a predetermined maximum value, after which said upper and lower portions thereof effectively comprise a tensile carrying means for carrying the entire device, said upper portion of said post member being provided with manually graspable carrying handle means to facilitate carrying the entire device.

6. Apparatus as defined in claim 1, wherein said tray member is provided with controllably removable and disposable protective tray-covering shield means and is provided with engaging and receiving means cooperable for effectively engaging and receiving same in mounted relationship with respect to said tray member.

7. Apparatus as defined in claim 1, wherein said tray member is provided with upwardly directed liquid-retaining edge guard means around the periphery thereof.

8. Bottle draining apparatus for facilitating the draining of relatively thick, viscous, pasty, semiliquid food materials of slurry-like form from narrow-necked bottles, comprising: an underlying tray member adapted to support a plurality of open-topped narrow-necked bottles in upstanding relationship thereon; and an upstanding central post member fixedly carried by said tray member substantially at the center thereof and extending to a substantial height thereabove, said upstanding post member having a lower portion closely adjacent to said underlying tray member and provided with a plurality of bottle receiving and positioning constraint ring means cooperable to receive corresponding enlarged bottom portions of a corresponding plurality of lower upwardly open narrow-necked bottles in erect relationship with the bottoms thereof resting on said tray member and with the open tops thereof being upwardly directed and being in predetermined symmetrically located positions around said upstanding post member, said upstanding post member having an upper portion provided with a plurality of bottle receiving and holding spring clamp means adapted to receive, engage, and hold the corresponding enlarged bottom portions of a corresponding number of upper narrow-necked open-topped bottles in inverted relationship positioned directly over and in vertical alignment with corresponding ones of said lower upwardly open narrow-necked bottles received and held by said lower bottle receiving and holding constraint means in erect relationship whereby to provide for the emptying of the contents of the upper inverted bottles into the corresponding erect lower bottles under the action of gravity.

9. Apparatus as defined in claim 8, wherein said upper portion of said upstanding post member is controllably telescopically upwardly extendable with respect to the lower portion thereof to facilitate separation of the open ends of the inverted upper bottles carried by said upper bottle holding clamp means and the corresponding lower erect bottles carried by said lower bottle holding and receiving constraint means.

10. Apparatus as defined in claim 8, wherein said upper and lower portions of said upstanding post member are provided with longitudinally slidable and rotary coupling means for relatively vertically upwardly telescopically slidably and relatively rotatably mounting said upper portion thereof with respect to said lower portion thereof to facilitate separation and rotary repositioning where desired of the open ends of the inverted upper bottles carried by said upper bottle holding clamp means and the corresponding vertically aligned lower bottles carried by said lower bottle holding and receiving constraint means.

11. Apparatus as defined in claim 8, wherein said upper and lower portions of said upstanding post member are provided with longitudinally slidable and rotary coupling means for relatively vertically upwardly telescopically slidably and relatively rotatably mounting said upper portion thereof with respect to said lower portion thereof to facilitate separation and rotary repositioning where desired of the open ends of the inverted upper bottles carried by said upper bottle holding clamp means and the corresponding vertically aligned lower bottles carried by said lower bottle holding and receiving constraint means, said longitudinally slidable and rotary coupling means being provided with travel-limiting stop means for limiting the relative upward movement of said upper portion of said upstanding post member to a predetermined maximum value, after which said upper and lower portions thereof effectively comprise a tensile carrying means for carrying the entire device.

12. Apparatus as defined in claim 8, wherein said upper and lower portions of said upstanding post member are provided with longitudinally slidable and rotary coupling means for relatively vertically upwardly telescopically slidably and relatively rotatably mounting said upper portion thereof with respect to said lower portion thereof to facilitate separation and rotary repositioning where desired of the open ends of the inverted upper bottles carried by said upper bottle holding clamp means and the corresponding vertically aligned lower bottles carried by said lower bottle holding and receiving constraint means, said longitudinally slidable and rotary coupling means being provided with travel-limiting stop means for limiting the relative upward movement of said upper portion of said upstanding post member to a predetermined maximum value, after which said upper and lower portions thereof effectively comprise a tensile carrying means for carrying the entire device, said upper portion of said post member being provided with manually graspable carrying handle means to facilitate carrying the entire device.

13. Apparatus as defined in claim 8, wherein said tray member is provided with controllably removable and disposable protective tray-covering shield means and is provided with engaging and receiving means cooperable for effectively engaging and receiving same in mounted relationship with respect to said tray member.

14. Apparatus as defined in claim 8, wherein said tray member is provided with upwardly directed liquid-retaining edge guard means around the complete periphery thereof.

References Cited by the Examiner

UNITED STATES PATENTS 2,059,997 11/1936 Kaestner _____ 141—106 X
3,156,272 11/1964 Indrunas _____ 141—310 X
3,168,272 2/1965 Swinyar _____ 211—77 X LAVERNE D. GEIGER, *Primary Examiner.*

H. BELL, *Assistant Examiner.*